(12) United States Patent
Miles

(10) Patent No.: US 12,494,654 B2
(45) Date of Patent: *Dec. 9, 2025

(54) BATTERY CHARGER WITH AUTOMATIC BATTERY TYPE IDENTIFICATION

(71) Applicant: Cheng USA, Inc., San Francisco, CA (US)

(72) Inventor: Michael T. Miles, Niles, MI (US)

(73) Assignee: Cheng USA, Inc., San Francisco, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 18/786,041

(22) Filed: Jul. 26, 2024

(65) Prior Publication Data

US 2024/0388105 A1 Nov. 21, 2024

Related U.S. Application Data

(63) Continuation of application No. 17/070,974, filed on Oct. 15, 2020, now Pat. No. 12,113,377.

(60) Provisional application No. 63/035,096, filed on Jun. 5, 2020.

(51) Int. Cl.
*H02J 7/00* (2006.01)

(52) U.S. Cl.
CPC ........ *H02J 7/00032* (2020.01); *H02J 7/0047* (2013.01); *H02J 7/00712* (2020.01)

(58) Field of Classification Search
CPC .................................................. H02J 7/00032
USPC ........................................................ 320/106
See application file for complete search history.

(56) References Cited

U.S. PATENT DOCUMENTS

| | | | |
|---|---|---|---|
| 12,113,377 B2 * | 10/2024 | Miles | B60L 53/65 |
| 2016/0047861 A1 * | 2/2016 | Chen | H02J 7/0047 324/426 |
| 2018/0026457 A1 * | 1/2018 | Delevski | H02J 7/0024 320/106 |
| 2019/0120910 A1 * | 4/2019 | Ghantous | H01M 10/44 |

* cited by examiner

*Primary Examiner* — Yalkew Fantu
(74) *Attorney, Agent, or Firm* — Faegre Drinker Biddle & Reath LLP

(57) ABSTRACT

A battery charger identifies the type of battery that is connected to it in order to provide the optimum voltage-current-time profile that is needed to safely and optimally charge and maintain the battery. In some embodiments, the battery current or voltage is monitored during charging, and as the current or the voltage changes while the charger is powered, the changes are measured and used to determine the type of battery that is connected so that the optimum charge profile can be applied.

23 Claims, 3 Drawing Sheets

BATTERY CHARGER WITH AUTOMATIC BATTERY TYPE IDENTIFICATION

RELATED APPLICATIONS

This application is a Continuation of U.S. Non-Provisional application Ser. No. 17/070,974 filed Oct. 15, 2020, that further claims the benefit of U.S. Provisional Application Ser. No. 63/035,096 filed on Jun. 5, 2020, which are hereby incorporated by reference in their entirety for all purposes.

TECHNICAL FIELD

The present disclosure relates to battery chargers; in particular, this disclosure relates to a battery charger that is configured to automatically identify a battery type being charged and optimize battery charging for the detected battery type.

BACKGROUND

Vehicles and portable systems with batteries to supply electrical power to appliances and accessories require a charger to maintain the energy in the battery. Typically, a shore-power connection or generator is used to supply a charger or converter/charger to charge the battery system.

At times when ac power is not available, a battery or a bank of batteries is used to provide dc power to operate the appliances and accessories. These batteries have traditionally been of the lead-acid type. Because those are heavy, require maintenance, and have a limited life span, a newer technology, lithium batteries, has become available. Lithium batteries provide more charge cycles, longer lifetime, lighter weight, and they need no maintenance. Lithium battery technology has been widely used in vehicles due to its high performance and high safety; now its use is increasing with many other applications. In addition to lithium batteries, there are other new types of batteries being developed.

To properly charge a battery, the charger or converter/charger needs to provide the correct charge profile for the battery that is used. For example, the charge voltage, current thresholds, and timing requirements are different for different battery types. Existing systems require the user to purchase the correct type of charger for the battery technology that is being used, or to set a switch or other device so that the charger will implement the correct charge profile for the battery.

With existing chargers, if a battery is replaced with a different type, either the charger needs to be replaced also, which is expensive, or the user needs to switch the charger setting, if it has settings, over to the new battery type. While manually switching the charger might be an option, there is a risk of it being set incorrectly. For example, some users may not be aware of the existence of the switch setting, or its importance, or it may be inadvertently switched to the wrong battery type. Additionally, some users may not be aware that a different battery type needs a different charge profile. Thus there is always the chance of causing damage to some batteries if the setting is incorrect.

Therefore, there is a need for a charger that can automatically set and use the correct charging profile without the inconvenience of manually setting a switch or the expense of changing chargers for a specific battery type.

SUMMARY

According to one aspect, this disclosure provides a battery charger with a controlled voltage source and a processor to control the voltage source. The controlled voltage source is configured to apply electrical power to a battery to be charged. The processor is electrically connected to the controlled voltage source and is configured to control one or more of current or voltage of the controlled voltage source applied to the battery to be charged. The battery charger includes a non-transitory, computer-readable storage media comprising a plurality of instructions stored thereon that, in response to being executed, cause the processor to: identify a battery type of the battery to be charged as a function of a time-related behavior of a charge current and/or a charge voltage of the battery to be charged; and control one or more of voltage or current of the controlled voltage source applied to the battery to be charged based on identification of the battery type of the battery to be charged.

According to another aspect, this disclosure provides a battery charger with a controlled voltage source configured to apply electrical power to a battery to be charged. The charger includes means for identifying a battery type of the battery to be charged as a function of a time-related behavior of a charge current and/or a charge voltage of the battery to be charged. There is also provided means for controlling one or more of voltage or current of the controlled voltage source applied to the battery to be charged based on identification of the battery type of the battery to be charged.

According to a further aspect, this disclosure provides a method of charging a battery. The method includes the step of monitoring one or more of charging voltage or charging current of a battery to be charged. A battery type of the battery to be charged is identified as a function of a time-related behavior of the charging current and/or the charging voltage of the battery to be charged. The method includes the step of setting a charging profile based on the identified battery type of the battery to be charged. The battery to be charged is charged as a function of the charging profile.

DETAILED DESCRIPTION OF THE DRAWINGS

Figures 1, 2:
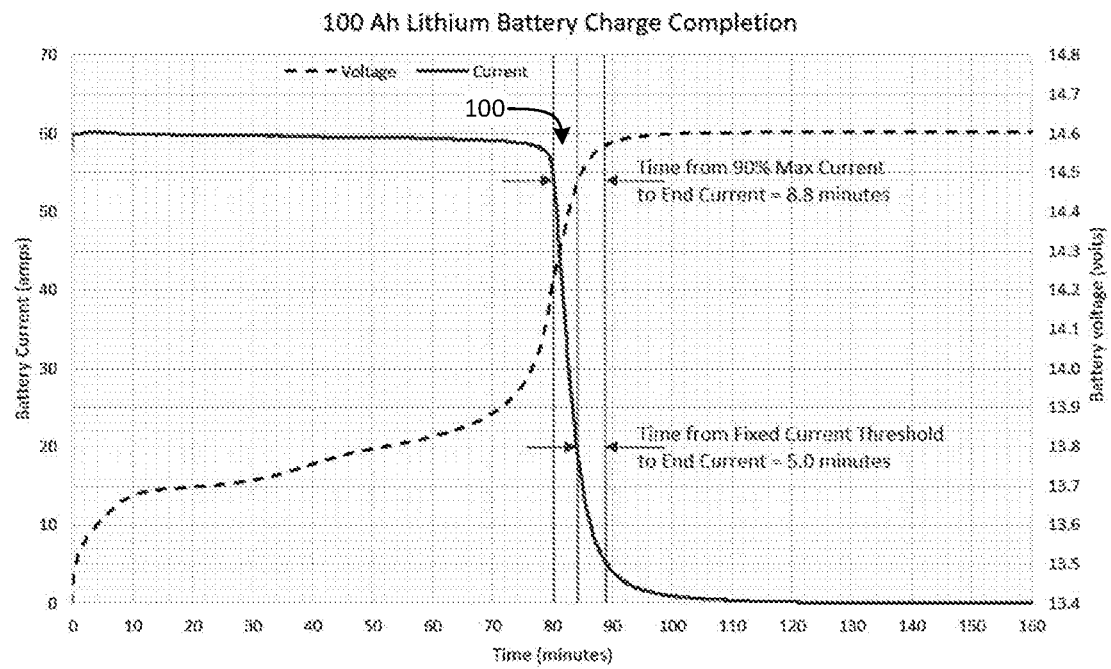
FIG. 1 is a diagram showing example current and voltage levels at completion of charging a lithium battery.
FIG. 2 is a diagram showing example current and voltage levels at completion of charging a lead acid battery.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

To ensure that a battery provides optimum output power and maximum lifetime, it is important to identify the battery type in order to correctly set the charge profile in the following ways:

The charge voltage needs to be set correctly in accordance with the battery type, the current draw, and the elapsed time.

With some types of batteries, the charge voltage needs to be further adjusted according to the temperature.

Depending on the battery type, the charge current or voltage may need to be different at different or extreme temperatures to avoid damaging the battery.

Depending on the battery type, a different voltage may be needed for maintenance and standby storage after the battery is fully charged.

Using the correct profile assures that the battery is managed optimally and can therefore provide the maximum available power with a maximum lifetime of service.

In some embodiments, this disclosure provides a battery charger that can identify a battery type based on only sensing output current and voltage; this type of charger provides advantages by being able to electrically identify the type of battery that is present using only that available output current and voltage information. Other embodiments are contemplated in which other types of sensors or communication schemes could be used to identify the battery; however, those added components increase complexity, cost, and may introduce opportunities for human error. In one or more embodiments, this charger allows the use of any battery, such as lead-acid, lithium, or other chemistry, and can automatically detect the type of battery without added installation complexity, and without any human intervention.

Although different battery types have different operating voltages under the same conditions, there is a wide range of battery operating conditions that are possible. These include state of charge, state of health, age, temperature, and in many applications, randomly existing external load current. With the typical range of all these variables, the battery voltage ranges of each type of battery mostly overlap. Therefore, a simple voltage measurement cannot distinguish between battery types. However, it has been discovered that there is a distinguishing characteristic that may be used for this purpose: the time-related behavior of the charge current and voltage, especially near the end of a charging cycle. This can indicate whether the battery is lead-acid, lithium-ion, or possibly other types such as nickel-based batteries, which show a different characteristic.

Referring to FIG. 1, there is shown the current at the completion of charging of a lithium battery (e.g., LiFePQ4). When a lithium battery is being charged, as it reaches full charge, the current will quickly drop. This is due to the battery chemistry; it happens when the carbon electrode becomes full of intercalated lithium ions and cannot hold any more. At this point, there is no longer a means for current flow, therefore the battery's conductivity decreases. As the current drops, its voltage may rise also, depending on its internal resistance and the applied power from the charger. When full charge is reached the current is also stopped by the battery's built-in battery management system. The drop in current and corresponding rise in voltage are relatively abrupt.

In the example shown in FIG. 1, the charge current of this battery can be seen to drop in transition zone 100 from 60 amps to 5 amps, while its voltage rises by about 0.5 volts, in a period of about nine minutes.

Referring now to FIG. 2, there is shown the current at the completion of charging of a lead-acid battery. When a lead-acid battery approaches full charge, three processes contribute to a gradual reduction of charge current. First, as part of the charging process, the lead sulfate on the electrodes gradually becomes depleted and less available, so the reaction rate and current draw gradually decrease. Second, heat generated by the charging reaction and charging current increases the self-discharge rate, which adds to the charge current, causing it to decrease more slowly. And third, when the battery approaches full charge, electrolysis—creation of hydrogen and oxygen from the water in the electrolyte—gradually starts at the higher charge voltage, and results in additional current through the battery. These effects combine to create an overall gradual reduction of charge current. In the example shown in FIG. 2, there is a transition zone 200 that shows the charge current of a lead-acid battery takes more than three hours to drop from 58 amps to 5 amps.

The total duration of a controlled charge current that a battery will sustain depends on the battery's capacity and its initial state of charge, in addition to the charge current level. But after the charge current begins to drop, when charging is approaching completion, the additional time it takes to drop to the finish current, which is a level of current indicating the voltage should be dropped for a slower charge rate, depends on the battery's chemistry and its associated technology. In general, upon charge completion, lithium batteries will show a much faster reduction of charge current than lead-acid batteries. Other types of batteries may show a different characteristic. This electrical performance can be used to identify which type of battery is connected. A battery charger can measure the time it takes for its output current to drop by proportional and/or preset levels, and use that time measurement, corresponding to the slope over a time period, to determine the type of battery that is connected.

The examples in FIGS. 1 and 2 show a large difference in the time that the charge current takes to drop from 90% of maximum down to 5 amps: 9 minutes for lithium and 186 minutes for lead-acid. A threshold between those values can be used to separate the battery types, since it is dependent on the battery chemistry. As an alternative, the times at which fixed thresholds of current or voltage are passed can be used to measure the charging characteristic and determine the battery type. For example, in FIG. 1 with a lithium battery, the amount of time between a first fixed current level (e.g., 20 amps) and a second fixed current level (e.g., 5 amps) is approximately 5 minutes, while in FIG. 2 with a lead-acid battery, the amount of time between the first fixed current level (e.g., 20 amps) and the second fixed current level (e.g., 5 amps) is approximately 161 minutes. Although the time period for the battery current to transition from 20 amps and 5 amps is discussed for purposes of example to differentiate between a lithium and lead-acid battery, other fixed currents in the transition zone could be used instead of those amperages. Likewise, although the time period between two fixed current thresholds is discussed above, a time period between two fixed voltage levels could be used to distinguish between battery types. In addition to (or alternatively from) the voltage and current characteristics used to differentiate between lithium and lead-acid batteries shown in FIGS. 1 and 2, other voltage and current characteristics could be observed between when the charger is powered on and when the battery is fully charged to identify the battery type.

Another related characteristic that can be observed is the rise of battery voltage when full charge is approached. In this example the voltage rise while current is decreasing is faster with lithium batteries than with lead-acid batteries. The examples in FIGS. 1 and 2 also show the slope of the voltage rise; lithium batteries have a higher slope than lead-acid batteries. By measuring the slope, or maximum slope, of the voltage rise, thresholds can be established to distinguish battery types—in this case, lithium batteries are faster with a higher slope; lead-acid batteries are slower with a lower slope. The voltage rise characteristic may be different for other types of batteries as well.

While the rate of voltage change is dependent on the battery type, it is also partly due to the voltage regulation characteristic of the charger, the series resistance in the battery circuit, and the effect of cell balancing by a lithium battery's battery management system. It is, to some degree, a result of the changing current affecting the output voltage of the charger. Although this voltage slope can be used to identify the battery type, in some cases the current drop slope may be used, as described previously. Whether observing the current, the voltage, or both for this characteristic may depend on the specific application and the types of batteries that may need to be identified.

Figure 3:
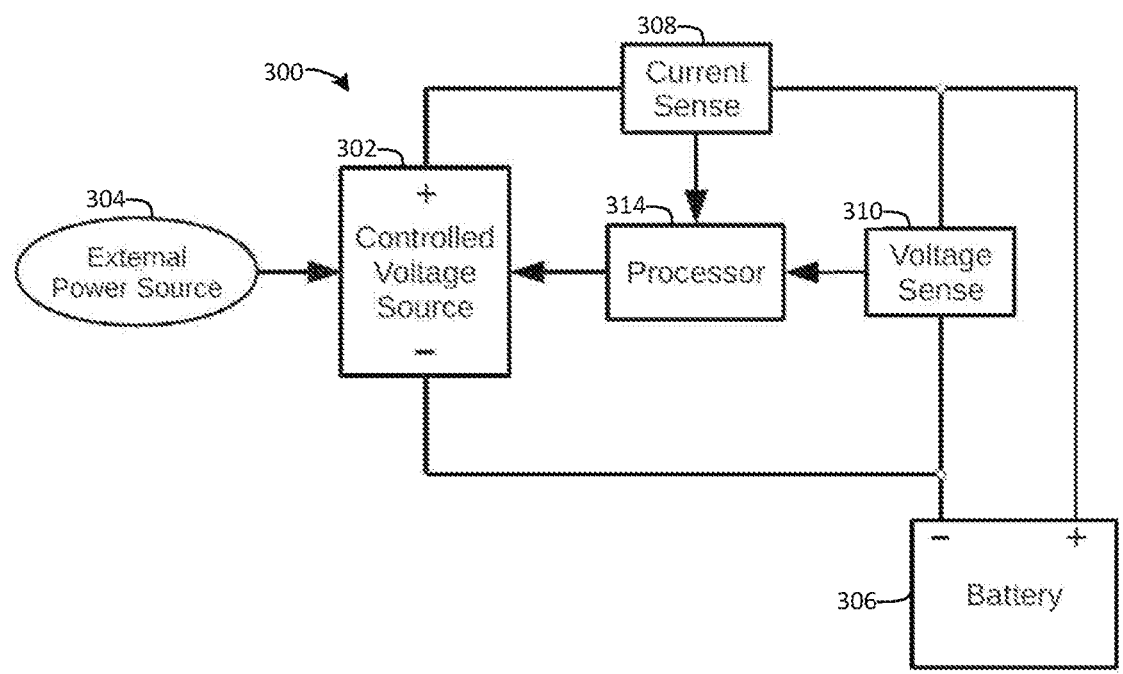
FIG. 3 is a simplified block diagram showing an example battery charger according to at least one embodiment.

FIG. 3 illustrates an embodiment of a battery charger 300 that is configured to automatically identify the battery type and optimize the charging profile based on the battery type identification. In the embodiment shown, the battery charger 300 includes a controlled voltage source 302, powered from an external power source 304, such as an ac power line or a generator. Although FIG. 3 shows a controlled voltage source 302 for purposes of example, a controlled current source or a controlled power source could be used depending on the circumstances. This voltage source 302 is connected to a battery 306 through a current sensor 308. In addition, in the embodiment shown, a voltage sensor 310 is connected to indicate the voltage at the battery terminals 312. The amount of current flowing through the battery 306 and the amount of voltage at the battery terminals are sent to a processor 314 so that the processor 314 can control the power applied to the battery 306. The processor 314 controls and regulates the battery voltage, the battery current, or both. For example, the processor 314 could be programmed with instructions stored in memory according to the method described with regard to FIG. 4.

Figure 4:
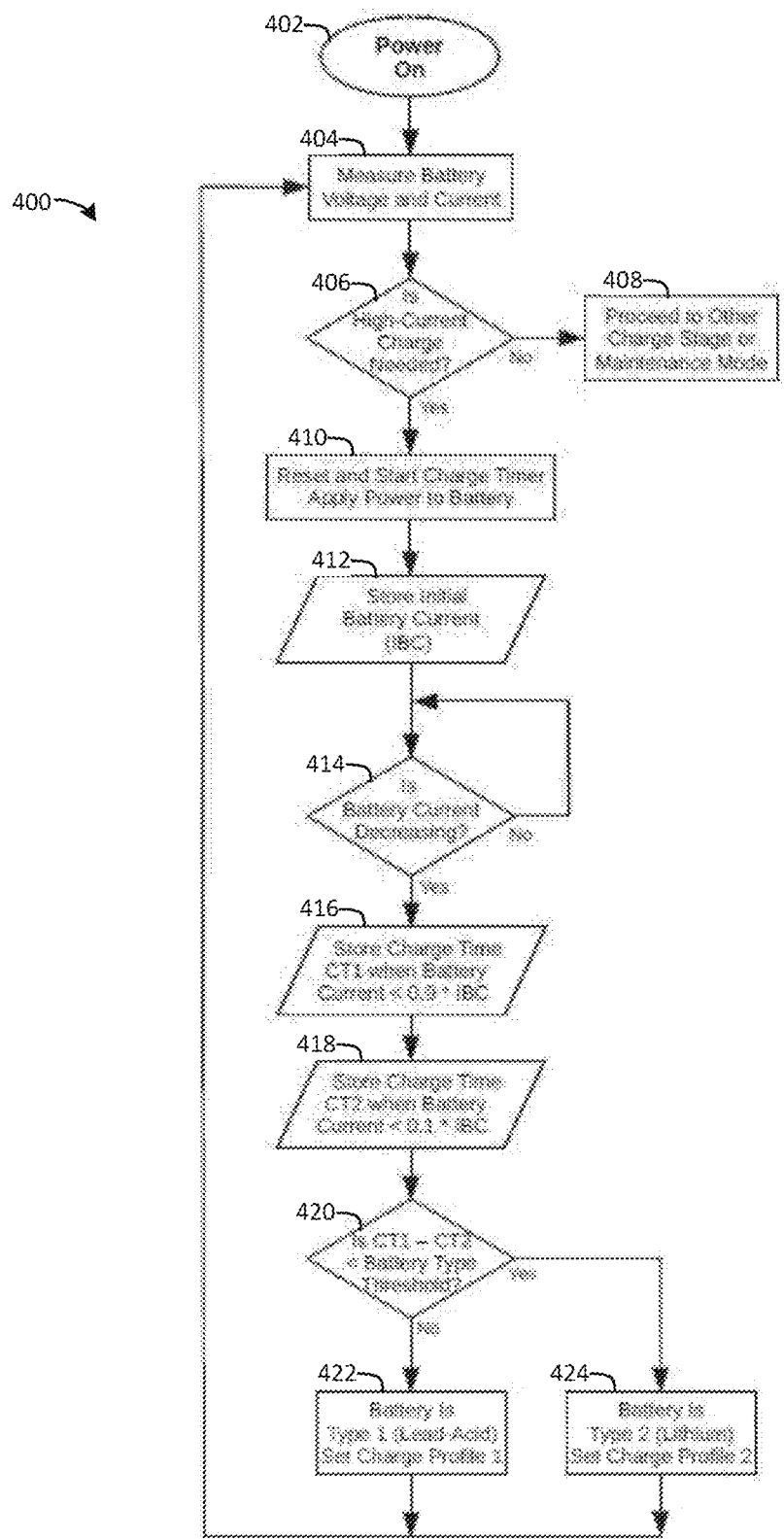
FIG. 4 is a simplified flow diagram of at least one embodiment of a method for identifying a battery type and selecting a charging profile based on the identification of the battery type.

Referring now to FIG. 4, in use, the processor 314 may execute a method 400 for identifying a battery type and manage charging according with a charging profile for the identified battery type. The charge profile that is programmed or designed into the charger 300 will set the current limit and the target voltage, which will be reached when the current drops below the limit. The profile may include a time limit, which can serve as a safety feature to avoid overcharging the battery in case the current does not drop as expected. In some embodiments, the charger 300 could have multiple stages to completely charge a battery, and the profile may contain current and voltage thresholds and time thresholds or limits for each stage. Although the example in FIG. 4 differentiates between lithium and lead-acid batteries using the current and voltage characteristics shown in FIGS. 1 and 2, it should be appreciated that other voltage and/or current characteristics other than changes in rate of voltage and/or current could be used to identify battery types.

In the example shown in FIG. 4, the method 400 starts at block 402 in which the charger 300 is powered on, such as with the external power source 304. The method 400 advances to block 404 in which the battery 306 voltage and current is measured, such as with current sensor 308 and voltage sensor 310. Next, the method 400 moves to block 406 in which a determination is made whether a high-current charge is needed based on the voltage and/or current measured. If a high current charge is not needed, the method 400 advances to block 408 in which another charge stage is entered or the charger 300 enters into maintenance mode. However, if a high current charge is needed, the charger 300 enters a "bulk charge" stage to provide maximum current into the battery 306. This stage can be used to identify the battery type, and an example of how this stage could be embodied is shown in FIG. 4. The high charging current provides good sensitivity and reliability of the identification. This works well when the battery 306 is significantly discharged, to two-thirds or less of its total capacity, when the charger is started. In this condition, the battery voltage will be relatively low, and when the charger 300 is connected to the battery 306 and the external power source 304 is applied to the charger 300, a high current can flow through the battery 306. This current may be limited to a certain maximum value which can depend on the charger's power output capability or the profile setting, as it allows sensing of the battery characteristics.

When the bulk charge stage begins, the method 400 progresses to block 410 in which a charger timer is started. This timer provides the basis that is used to measure the rate of change of the charge current. After starting the timer, the method advances to block 412 in which an initial battery current reading (IBC) is stored in memory. For example, the current sensor 308 could be used to determine the IBC. The method 400 proceeds to block 414 in which the battery current is monitored to determine when the current starts to decrease. For example, the currently sensed current could be compared with the IBC stored in memory to determine when the current is decreasing.

Initially, the battery charge current will be at or near its maximum possible value, and typically it will not change significantly until the battery approaches full charge. When the battery approaches full charge, the current will begin to drop. In some cases, a current decrease threshold could be established to when to store a charge time indicating that the current has started to drop. By way of example only, the threshold could be a fixed value or a percentage of the IBC, such as 90% of the IBC. When the current drops below this threshold, the method 400 advances to block 416 in which the time value on the charge timer is stored and this time could be referenced as CT1.

The battery current will continue to drop as the battery becomes more charged, as discussed above with regard to FIGS. 1 and 2. Eventually the current will reach a lower threshold, which can be a fixed level or a percentage of the IBC. By way of example, the lower threshold could be 10% of IBC. When the battery current drops below that level, the method proceeds to block 418 in which the time value on the charge timer is stored and this time could be referenced as CT2.

The method 400 then advances to block 420 in which the value of CT2−CT1, the current-drop time, is calculated, and compared to a battery type threshold. In some embodiments, this battery type threshold is predetermined and based on the charger capacity, and the types and capacity range of the batteries that may be used in the application. One skilled in the art should appreciate that multiple thresholds for current-drop time could be established for different types of batteries so that a plurality of battery types could be identified. There could be more than one threshold and more than one battery type.

The method 400 then progresses to block 420 in which a determination is made whether the difference between CT1 and CT2 is below the battery type threshold; if the difference between CT1 and CT2 is above the battery type threshold, the method 400 advances to block 422 in which a first battery type is identified (such as lead-acid battery), and one or more parameters of a charge profile corresponding to the first battery type (e.g., lead-acid battery) is set. If the difference between CT1 and CT2 is below the battery type threshold, the method 400 proceeds to block 424 in which a second battery type is identified (such as lithium battery), and one or more parameters of a charge profile corresponding to the second battery type (e.g., lithium battery) is set.

In the example shown in FIG. 4, the charger 300 can determine the battery type between a lead-acid battery and a lithium battery. As explained with respect to FIGS. 1-2, there is a longer current-drop time for a lead-acid battery compared to a lithium battery. Accordingly, if the current-drop time is above the threshold, the battery could be determined to be a lead-acid type, or a type with a long current-drop time. If the current-drop time is lower than the threshold, then it can be determined to be a lithium battery, or a type with a short current-drop time.

In some embodiments, the initial profile that is used in the charger 300 can be a compatible profile that is safe for either battery type. After the first charge cycle, one or more of the charge profile parameters can be set optimally based on the battery type identified. For example, charge profile parameters, such as the charger's target voltage, target current, and time period, or sequence of target voltages, target currents, and time periods, could be set for use thereafter with the connected battery. In some embodiments, a plurality of charging profiles could be stored in the memory of the charger 300, and an appropriate charging profile can be selected based on the battery type identified. Each time the battery is recharged, its battery type is identified again. Therefore, if a battery type is changed, the profile will be updated the next time the battery is charged.

EXAMPLES

Illustrative examples of the battery charging technologies disclosed herein are provided below. An embodiment of the technologies may include any one or more, and any combination of, the examples described below.

Example 1 is a battery charger with one or more of a controlled voltage source, a controlled current source or a controller power source configured to apply electrical power to a battery to be charged. The charger has a processor electrically connected to the controlled voltage source, controlled current source and/or controlled power source, wherein the processor is configured to control one or more of current or voltage of the controlled voltage source, controlled current source and/or controlled power source applied to the battery to be charged. There is a non-transitory, computer-readable storage media comprising a plurality of instructions stored thereon that, in response to being executed, cause the processor to: identify a battery type of the battery to be charged as a function of a time-related behavior of a charge current and/or a charge voltage of the battery to be charged; and control one or more of voltage or current of the controlled voltage source applied to the battery to be charged based on identification of the battery type of the battery to be charged.

Example 2 includes the subject matter of Example 1, and wherein: to identify the battery type of the battery to be charged comprises (i) determining one or more of a rate at which the charge current changes or a rate at which the charge voltage changes; and (ii) determining the battery type of the battery to be charged based on the rate at which the charge current changes and/or the rate at which the charge voltage changes.

Example 3 includes the subject matter of Examples 1-2, and wherein: to identify the battery type of the battery to be charged comprises (i) determining one or more of a rate at which the charge current decreases or a rate at which the charge voltage increases; and (ii) determining the battery type of the battery to be charged based on the rate at which the charge current decreases and/or the rate at which the charge voltage increases.

Example 4 includes the subject matter of Examples 1-3, and wherein: to identify the battery type of the battery to be charged comprises (i) determining one or more of a slope at which the charge current decreases or a slope at which the charge voltage increases; and (ii) determining the battery type of the battery to be charged based on the slope at which the charge current decreases and/or the slope at which the charge voltage increases.

Example 5 includes the subject matter of Examples 1-4, and further including one or more instructions to establish a plurality of charging profiles corresponding with a plurality of battery types, wherein at least a portion of the plurality of charging profiles are associated with a threshold rate at which the charge current decreases and/or a threshold rate at which the charge voltage increases.

Example 6 includes the subject matter of Examples 1-5, and further including one or more instructions to select a charging profile from the plurality of charging profiles based on the rate at which the charge current decreases and/or the rate at which the charge voltage increases exceeding the threshold rate at which the charge current decreases and/or the threshold rate at which the charge voltage increases corresponding to a respective charging profile of the plurality of charging profiles.

Example 7 includes the subject matter of Examples 1-6, and wherein: to select the charging profile from the plurality of charging profiles comprises controlling the controlled voltage source as a function of one or more parameters of the selected charging profile.

Example 8 includes the subject matter of Examples 1-7, and wherein: the charging profile comprises one or more of a target voltage, a current limit, a time limit, a sequence of target voltages, a sequence of current limits, or a sequence of time limits of the controlled voltage source.

Example 9 includes the subject matter of Examples 1-8, and further including: one or more instructions to distinguish between a lead-acid battery type and a lithium battery type, wherein to distinguish between the lead-acid battery type and the lithium battery type comprises determining whether one or more of a rate at which the charge current decreases or a rate at which the charge voltage increases exceeds a threshold value.

Example 10 includes a battery charger with a controlled voltage source configured to apply electrical power to a battery to be charged. The charger includes means for identifying a battery type of the battery to be charged as a function of a time-related behavior of a charge current and/or a charge voltage of the battery to be charged. The charger also includes means for controlling one or more of voltage or current of the controlled voltage source applied to the battery to be charged based on identification of the battery type of the battery to be charged.

Example 11 includes the subject matter of Example 10, and wherein: the means for identifying the battery type of the battery to be charged comprises comparing a rate at which the charge current changes and/or a rate at which the charge voltage changes with previously established data correlating battery type with an approximate change in current and/or voltage.

Example 12 includes the subject matter of Examples 10-11, and wherein: the means for identifying the battery type of the battery to be charged comprises comparing a rate of charge current decrease and/or charge voltage increase with previously established data correlating battery type with an approximate charge current decrease and/or charge voltage increase.

Example 13 includes the subject matter of Examples 10-12, and wherein: the means for controlling one or more of voltage or current of the controlled voltage source applied to the battery to be charged comprises controlling the controlled voltage source as to one or more of a target voltage, a current limit, a time limit, a sequence of target voltages, a sequence of current limits, or a sequence of time limits based on the identified battery type.

Example 14 includes the subject matter of Examples 10-13, and wherein: the means for identifying the battery type of the battery to be charged comprises (i) monitoring a charge voltage and/or a charge current as the controlled voltage source transfers power to the battery to be charged, (ii) determining a rate at which current decreases and/or voltage increases as the battery charges, and (iii) comparing the determined rate of current decrease and/or voltage increase with a previously established rates of voltage increase and/or current decrease to determine the battery type of the battery to be charged.

Example 15 includes the subject matter of Examples 10-14, and wherein: the means for controlling one or more of voltage or current of the controlled voltage source applied to the battery to be charged based on identification of the battery type of the battery to be charged comprises (i) establishing a plurality of charging profiles corresponding to a plurality of battery types, wherein at least a portion of the plurality of charging profiles includes one or more of a target voltage, a target current, or a charging time period; and (ii) selecting a charging profile from the plurality of charging profiles based on identification of battery type.

Example 16 includes the subject matter of Examples 10-15, and wherein: the means for identifying the battery type of the battery to be charged comprises (i) monitoring a charge voltage and/or a charge current as the controlled voltage source transfers power to the battery to be charged; (ii) determining a time at which the charge current has decreased to a first relative level, and/or the charge voltage has increased to a first relative level when the battery to be charged initially approaches being fully charged; (iii) determining a time at which the charge current has decreased to a second relative level, and/or the charge voltage has increased to a second relative level when the battery to be charged further approaches being fully charged, (iv) calculating a period of time passing between the first relative level and the second relative level, and (v) identifying the battery type as a function of the period of time passing between the first relative level and the second relative level.

Example 17 includes the subject matter of Examples 10-16, and wherein: the means for identifying the battery type of the battery to be charged comprises (i) monitoring a charge voltage and/or a charge current as the controlled voltage source transfers power to the battery to be charged; (ii) determining a time at which the charge current has decreased to a first fixed level, and/or the charge voltage has increased to a first fixed level when the battery to be charged initially approaches being fully charged; (iii) determining a time at which the charge current has decreased to a second fixed level, and/or the charge voltage has increased to a second fixed level when the battery to be charged further approaches being fully charged, (iv) calculating a period of time passing between the first fixed level and the second fixed level, and (v) identifying the battery type as a function of the period of time passing between the first fixed level and the second fixed level.

Example 18 includes the subject matter of Examples 10-17, and wherein: the means for identifying the battery type of the battery to be charged is configured to identify whether the battery to be charged is a lithium battery or a lead-acid battery as a function of a time-related behavior of a charge current and/or a charge voltage of the battery to be charged.

Example 19 includes a method of charging a battery. The method includes the step of monitoring one or more of charging voltage or charging current of a battery to be charged. A battery type of the battery to be charged is identified as a function of a time-related behavior of the charging current and/or the charging voltage of the battery to be charged. The method includes the step of setting a charging profile based on the identified battery type of the battery to be charged. The battery to be charged is charged as a function of the charging profile.

Example 20 includes the subject matter of Example 19, and wherein: identifying the battery type of the battery to be charged comprises (i) determining one or more of a rate at which the charging current changes or a rate at which the charging voltage changes; and (ii) determining the battery type of the battery to be charged based on the rate at which the charge current changes and/or the rate at which the charge voltage changes.

Example 21 includes the subject matter of Examples 18-20, and wherein: identifying the battery type of the battery to be charged comprises (i) determining one or more of a rate at which the charging current decreases or a rate at which the charging voltage increases; and (ii) determining the battery type of the battery to be charged based on the rate at which the charge current decreases and/or the rate at which the charge voltage increases.

Example 22 includes the subject matter of Examples 18-21, and further comprising: establishing a plurality of charging profiles corresponding with one or more of charging voltage characteristics or charging current characteristics for a plurality of battery types, wherein setting the charging profile comprises selecting a charging profile from the plurality of charging profiles that most closely matches the charging voltage characteristics and/or charging current characteristics based on the rate at which the charging current decreases and/or the rate at which the charging voltage increases.

Example 23 includes the subject matter of Examples 18-22, and wherein: the charging profile comprises one or more of a target voltage, a current limit, a time limit, a sequence of target voltages, a sequence of current limits, or a sequence of time limits of the controlled voltage source.

Example 24 includes the subject matter of Examples 18-23, and wherein: identifying the battery type of the battery to be charged comprises distinguishing between a lead-acid battery type and a lithium battery type based on one or more of a rate at which the charging current decreases or a rate at which the charging voltage increases.

Example 25 includes the subject matter of Examples 18-24, and wherein: identifying the battery type of the battery to be charged comprises (i) determining a time at which the charging current has decreased to a first relative level and/or the charge voltage has increased to a first relative level when the battery to be charged initially approaches being fully charged; (ii) determining a time at which the charging current has decreased to a second relative level and/or the charging voltage has increased to a second relative level when the battery to be charge further approaches being fully charged, (iii) calculating a period of time passing between the first relative level and the second relative level, and (v) identifying the battery type as a function of the period of time passing between the first relative level and the second relative level.

Example 26 includes the subject matter of Examples 18-25, and wherein: the means for identifying the battery type of the battery to be charged comprises (i) monitoring a charge voltage and/or a charge current as the controlled voltage source transfers power to the battery to be charged; (ii) determining a time at which the charge current has decreased to a first fixed level, and/or the charge voltage has increased to a first fixed level when the battery to be charged initially approaches being fully charged; (iii) determining a time at which the charge current has decreased to a second fixed level, and/or the charge voltage has increased to a second fixed level when the battery to be charged further approaches being fully charged, (iv) calculating a period of time passing between the first fixed level and the second fixed level, and (v) identifying the battery type as a function of the period of time passing between the first fixed level and the second fixed level.

What is claimed:

1. A battery charger, comprising:
   a charging circuit configured to apply power to a battery to be charged; and
   a processor connected to the charging circuit to control application of power to the battery;
   wherein the processor is configured to identify whether the battery is a first type or a second type by (a) determining an initial charge characteristic of the battery, (b) determining a first time when the initial charge characteristic changes by a first amount, indicating that the battery is nearing charge completion, (c) determining a second time when the initial charge characteristic changes by a second amount, (d) determining a difference between the first time and the second time, (e) determining that the battery is the first type when the difference is greater than a threshold time, and (f) determining that the battery is the second type when the difference is less than the threshold value; and
   wherein the processor is configured to, in a subsequent application of power to the battery, control the charging circuit to apply power to the battery based upon the determined battery type.

2. The battery charger of claim 1, wherein the charge characteristic is charge current.

3. The battery charger of claim 1, wherein, in the subsequent application of power to the battery, the processor controls the charging circuit in accordance with a stored charging profile corresponding to the determined battery type.

4. The battery charger of claim 3, wherein the stored charging profile comprises one or more of a target voltage, a current limit, a time limit, a sequence of target voltages, a sequence of current limits, or a sequence of time limits of the charging circuit.

5. The battery charger of claim 1, wherein the first amount is a first percentage of the initial charge characteristic and the second amount is a second, smaller percentage of the initial charge characteristic.

6. The battery charger of claim 1, wherein the first type of battery is a lead-acid battery and the second type of battery is a lithium battery.

7. The battery charger of claim 1, further comprising a sensor connected to the processor, the sensor being configured to measure the charge characteristic.

8. The battery charger of claim 1, wherein the processor is configured to determine the initial charge characteristic of the battery while controlling to charging circuit to provide a maximum current into the battery.

9. A battery charger, comprising:
   means for applying a charge current to a battery to be charged;
   means for identifying the battery as a first battery type when, after the charge current begins to decrease near charge completion, a rate at which the charge current decreases is greater than a threshold value and for identifying the battery as a second battery type when, after the charge current begins to decrease near charge completion, the rate at which the charge current decreases is less than the threshold value; and
   means for controlling application of the charge current based upon the identified battery type.

10. The battery charger of claim 9, wherein the threshold value corresponds to previously established data describing the rate at which the charge current decreases for the first battery type and the second battery type.

11. The battery charger of claim 9, wherein the means for controlling application of the charge current comprises controlling one or more of a target voltage, a current limit, a time limit, a sequence of target voltages, a sequence of current limits, or a sequence of time limits based upon the identified battery type.

12. The battery charger of claim 9, wherein the means for identifying the battery comprises comparing the charge current changes with time, during part or all of a charging cycle, to established limits, or profile curves, and using a best fit and/or tolerance fit to identify the battery type and/or an optimum charging profile to use thereafter.

13. The battery charger of claim 9, wherein the means for controlling application of the charge current comprises (a) establishing a plurality of charging profiles corresponding to a plurality of battery types, wherein at least a portion of the plurality of charging profiles includes one or more of a target voltage, a target current, or a charging time period; and (b) selecting a charging profile from the plurality of charging profiles based upon the identified battery type.

14. The battery charger of claim 9, wherein the means for identifying the battery comprises (a) monitoring the charge current as the battery is charged; (b) determining a time at which the charge current has decreased to a first relative level when the battery initially approaches being fully charged; (c) determining a time at which the charge current has decreased to a second relative level when the battery further approaches being fully charged; (d) calculating a period of time passing between the first relative level and the second relative level; and (e) identifying the battery type as a function of the period of time passing between the first relative level and the second relative level.

15. The battery charger of claim 9, wherein the means for identifying the battery comprises (a) monitoring the charge current as the battery is charged; (b) determining a time at which the charge current has decreased to a first fixed level when the battery initially approaches being fully charged; (c) determining a time at which the charge current has decreased to a second fixed level when the battery further approaches being fully charged; (d) calculating a period of time passing between the first fixed level and the second fixed level; and (e) identifying the battery type as a function of the period of time passing between the first fixed level and the second fixed level.

16. The battery charger of claim 9, wherein the first battery type is a lead-acid battery type and the second battery type is a lithium battery type.

17. A method of charging a battery, comprising:
monitoring application of power to a battery to be charged;
determining an initial charge characteristic of the battery;
determining a first time when the initial charge characteristic changes by a first amount, indicating that the battery is nearing charge completion;
determining a second time when the initial charge characteristic changes by a second amount;
determining a difference between the first time and the second time;
determining that the battery is a first type when the difference is greater than a threshold time;
determining that the battery is a second type when the difference is less than the threshold value; and
in a subsequent application of power to the battery, controlling the application of power based upon the determined battery type.

18. The method of claim 17, wherein the charge characteristic is charge current.

19. The method of claim 17, wherein, in a subsequent application of power to the battery, controlling the application of power based upon the determined battery type comprises using a charging profile including one or more of charging voltage characteristics or charging current characteristics corresponding to the determined battery type.

20. The method of claim 19, wherein using a charging profile includes selecting, from a plurality of charging profiles, the charging profile that most closely matches the one or more of charging voltage characteristics or charging current characteristics corresponding to the determined battery type.

21. The method of claim 19, wherein the charging profile comprises one or more of a target voltage, a current limit, a time limit, a sequence of target voltages, a sequence of current limits, or a sequence of time limits of a source for applying power to the battery.

22. The method of claim 17, wherein the first amount is first level relative to the initial charge characteristic and the second amount is a second level relative to the initial charge characteristic.

23. The method of claim 17, wherein the first type is a lead-acid battery type and the second type is a lithium battery type.

* * * * *